Jan. 8, 1924.
C. H. OLSON ET AL
1,479,829
DEVICE FOR REMOVING CARBON FROM PISTON GROOVES
Filed May 22, 1922    2 Sheets-Sheet 1
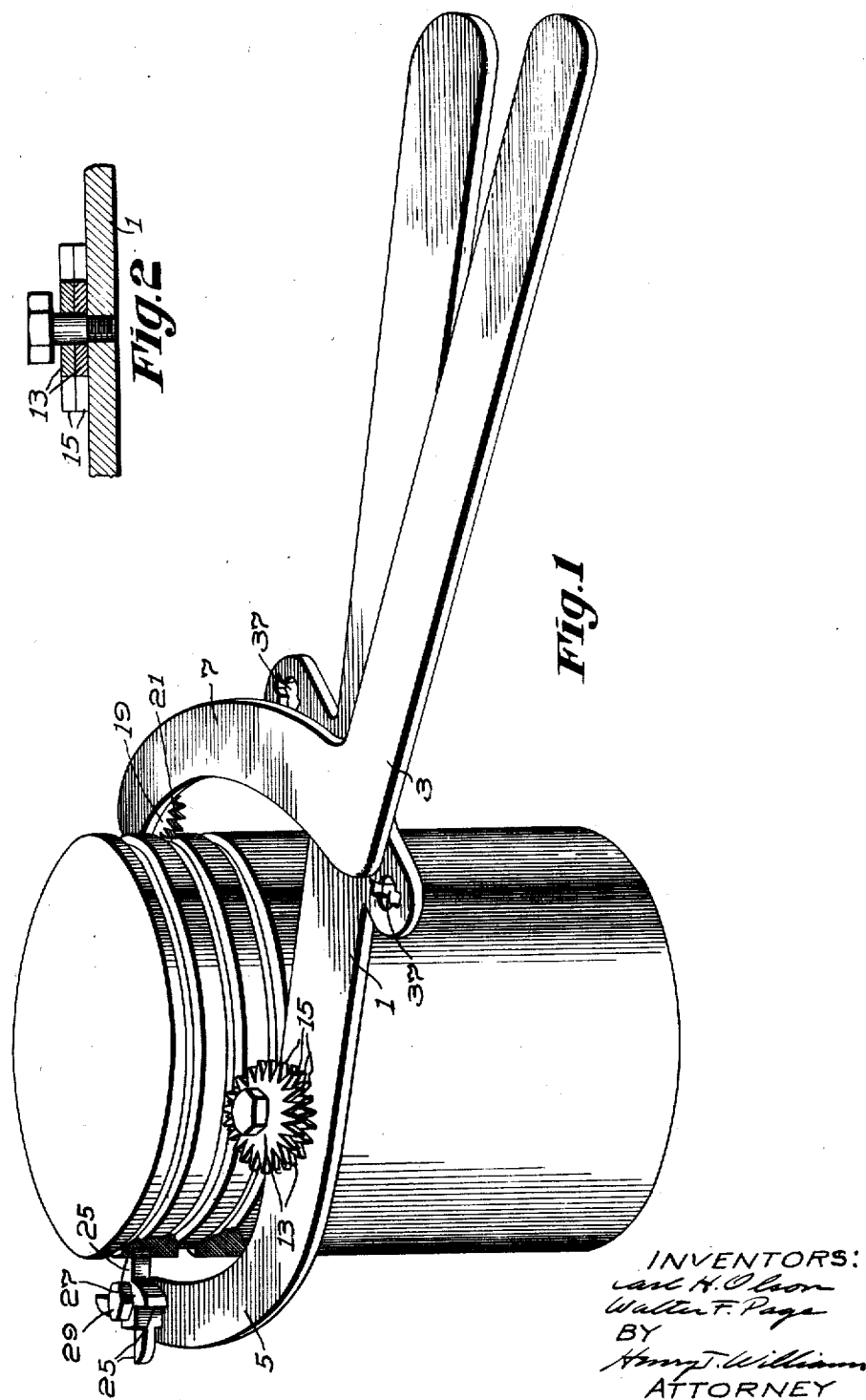

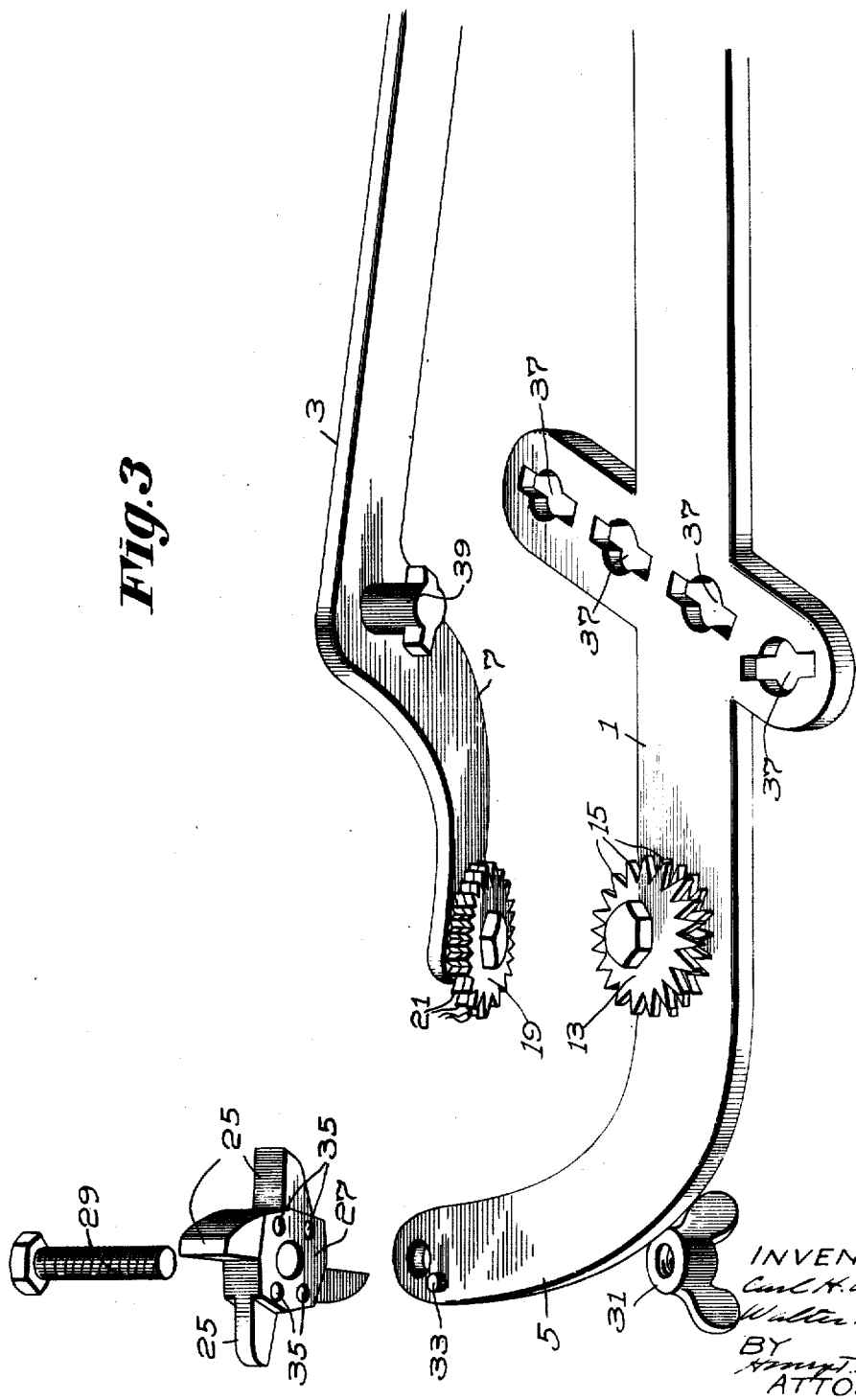

Patented Jan. 8, 1924.

1,479,829

UNITED STATES PATENT OFFICE.

CARL H. OLSON AND WALTER F. PAGE, OF BOSTON, MASSACHUSETTS, ASSIGNORS TO THE MORGAN MANUFACTURING COMPANY, INCORPORATED, OF KEENE, NEW HAMPSHIRE, A CORPORATION OF NEW HAMPSHIRE.

DEVICE FOR REMOVING CARBON FROM PISTON GROOVES.

Application filed May 22, 1922. Serial No. 562,589.

*To all whom it may concern:*

Be it known that we, CARL H. OLSON and WALTER F. PAGE, citizens of the United States, residing at Boston, in the county of Suffolk and State of Massachusetts, have invented an Improvement in Devices for Removing Carbon from Piston Grooves, of which the following description, in connection with the accompanying drawings, is a specification, like characters on the drawings representing like parts.

The invention to be hereinafter described relates to devices for removing carbon from circumferential grooves, such, for example, as piston ring grooves.

Carbon accumulates in these grooves, and since it is very hard, considerable difficulty has been experienced in readily removing carbon therefrom.

The present invention provides a simple and efficient device whereby the carbon may be broken down or disintegrated, and then easily removed from the groove.

In carrying the invention into practical effect, in the present instance, a holder is provided having toothed wheels and a clearing tool mounted thereon, said wheels and tool being adapted for introduction into a piston ring groove. Then the holder may be given a rotary motion, causing the wheels to roll along the groove and disintegrate the carbon therein, said wheels being followed by the clearing tool, which may have a width substantially equal to the width of the groove, and serve readily to clear out the carbon from the groove.

The character of the invention may be best understood by reference to the following description of one good form thereof, shown in the accompanying drawing, wherein:

Fig. 1 is a perspective view of the device;
Fig. 2 is a sectional detail; and
Fig. 3 is a perspective view showing the parts of the device separated, more clearly to disclose their construction.

Referring to the drawing, the carbon removing device shown therein as one good form of the invention, comprises a holder having members 1 and 3 formed to present curved arms 5 and 7 and handles 9 and 11.

Mounted on the curved arm 5 of the member 1, are a pair of wheels 13, each having a multiplicity of sharp teeth 15. These wheels are supported by a shaft 17 carried by said arm, and said wheels are freely rotatable on said shaft and susceptible of limited lateral movement longitudinally of the shaft.

Mounted on the curved arm 7 are a pair of wheels 19, each having a multiplicity of sharp teeth 21. These wheels are supported by a shaft 23 carried by said arm, and are freely rotatable on said shaft and susceptible of limited lateral movements.

Mounted on the curved arm 5 conveniently adjacent the end thereof, a clearing tool may be provided. In the present instance, four tools 25, having different widths to conform to piston ring grooves of different widths, project from a wheel 27 mounted on a bolt 29 entered through the arm 5, said bolt having a head at one end thereof and a wing nut 31 at the opposite end thereof. A pin 33 projects from the arm 5, and is adapted to enter one or another of four holes 35 on the wheel. On release of the wing nut, the wheel may be adjusted to bring one or another of the holes 35 in registration with the pin 33. Then the wheel may be adjusted along the bolt to cause the pin to enter the selected hole, and when the wing nut is tightened, the wheel will be securely held in its position of rotative adjustment.

Suitable means may be provided pivotally to connect the members 1 and 3. In the present instance, this means comprises a plurality of holes 37 in the member 1, said holes being formed to receive a T-shaped stud 39 projecting from the member 3. The two members may be relatively adjusted, so that the head of the T-shaped stud may enter one or another of the holes 37, and then the members may be relatively adjusted to move the wheels 19 away from the wheels 13. This will cause the head of the stud to extend transversely of the elongated slot in the holes, and thereby prevent separation of the members. The construction is such that the members may be pivotally connected at different points, so that the holder may be adjusted to conform to pistons of different diameters.

In use, the handles 9 and 11 are spread apart so as to rock the wheels 19 away from the wheels 13 sufficiently to allow the wheels and clearing tool to be presented to the piston ring groove. Then the handles are adjusted toward each other, thereby pressing the wheels and the clearing tool toward the bottom of the groove. Then the handles may be given a rotary motion in a contraclockwise direction, causing the wheels and tool to move circumferentially in the groove.

The wheels will break down or disintegrate the carbon in the groove, and the clearing tool will follow the wheels and clear from the groove the carbon thus broken down or disintegrated.

The device described for clearing carbon from grooves is simple in construction, it may be cheaply manufactured, and it serves quickly and easily to remove the carbon from the groove without cutting or injuring the groove.

It will be understood that the invention is not limited to the specific embodiment shown, and that various deviations may be made therefrom without departing from the spirit and scope of the appended claims.

What is claimed is:

1. A device for removing carbon from piston ring grooves, comprising, in combination, a pair of arms pivotally connected intermediate the ends thereof, sharp toothed wheels mounted on said arms for disintegrating the carbon in a piston groove, and a tool mounted on one of the arms adapted to follow the wheels along the groove and clear the disintegrated carbon therefrom when the device is given rotary motion.

2. A device for removing carbon from piston ring grooves, comprising, in combination, a holder, toothed wheels mounted on said holder adapted to roll along a piston groove to disintegrate carbon therein, and a tool mounted on the holder adapted to follow the wheels along the groove and clear the disintegrated carbon therefrom.

3. A device for removing carbon from piston ring grooves, comprising, in combination, a holder, and toothed wheels rotatably mounted on said holder adapted to be presented to a piston groove and roll along the same to disintegrate carbon therein when the holder is given rotary motion.

4. A device for removing carbon from piston ring grooves, comprising, in combination, a holder, a toothed wheel rotatably mounted on said holder, and a tool held in fixed position on said holder, said toothed wheel being adapted to disintegrate the carbon in the piston groove, and said tool being adapted to follow the wheel through the groove and clear the carbon therefrom when the holder is given a rotary motion.

5. A device for removing carbon from piston ring grooves, comprising, in combination, a holder comprising a pair of pivotally connected members, and elements rotatably mounted on said members having provision for disintegrating carbon in a piston groove when the holder is given a rotary motion.

6. A device for removing carbon from piston ring grooves, comprising, in combination, a holder, means mounted thereon for disintegrating the carbon in a piston groove, and means mounted on the holder for following the disintegrating means to clear the carbon from the groove.

7. A device for removing carbon from piston ring grooves, comprising, in combination, a holder, a shaft on said holder, a pair of toothed wheels mounted on said shaft for introduction into a piston groove to disintegrate carbon therein, and a tool mounted on said holder adapted to follow said wheels along the groove to clear the disintegrated carbon therefrom when the holder is given a rotary motion.

8. A device for removing carbon from piston ring grooves, comprising, in combination, a holder comprising members having oppositely curved portions and handle portions, means pivotally to connect said members, a toothed wheel mounted on one of said members, and a toothed wheel and a clearing tool mounted on the other member, said wheels and tool being adapted to be pressed into a piston groove when said handle portions are adjusted toward each other.

9. A device for removing carbon from piston ring grooves, comprising, in combination, a holder comprising a pair of members pivotally connected intermediate the ends thereof and having handle portions, a shaft on one of said members, a pair of toothed wheels on said shaft, a shaft on the other member, and a pair of toothed wheels on the latter shaft, said wheels being adapted to be pressed into a piston groove and remove carbon therefrom when the handle portions are grasped and given a rotary motion.

10. A device for removing carbon from piston ring grooves, comprising, in combination, a holder having a pair of relatively adjustable members, toothed wheels rotatably mounted on said members, a wheel on one of said members having a plurality of tools of different widths, said wheel being rotatively adjustable selectively to present the tools in active position, and means to lock said wheel in different positions of adjustment.

11. A device for removing carbon from piston ring grooves, comprising, in combination, a holder having a pair of relatively adjustable members, an element mounted on